(12) United States Patent
Rankl

(10) Patent No.: US 8,838,925 B2
(45) Date of Patent: Sep. 16, 2014

(54) METHOD FOR SECURELY STORING DATA IN A MEMORY OF A PORTABLE DATA CARRIER

(75) Inventor: Wolfgang Rankl, Munich (DE)

(73) Assignee: Giesecke & Devrient GmbH, Munich (DE)

(*) Notice: Subject to any disclaimer, the term of this patent is extended or adjusted under 35 U.S.C. 154(b) by 441 days.

(21) Appl. No.: 13/129,417

(22) PCT Filed: Aug. 20, 2009

(86) PCT No.: PCT/EP2009/006049
§ 371 (c)(1),
(2), (4) Date: May 16, 2011

(87) PCT Pub. No.: WO2010/054709
PCT Pub. Date: May 20, 2010

(65) Prior Publication Data
US 2011/0225383 A1    Sep. 15, 2011

(30) Foreign Application Priority Data

Nov. 17, 2008 (DE) .......................... 10 2008 057 681

(51) Int. Cl.
| | | |
|---|---|---|
| G06F 21/79 | (2013.01) | |
| G11C 16/22 | (2006.01) | |
| G11C 29/52 | (2006.01) | |
| G11C 7/24  | (2006.01) | |
| G11C 8/20  | (2006.01) | |

(52) U.S. Cl.
CPC ...................................... *G06F 21/79* (2013.01)
USPC ............ 711/163; 711/E12.001; 711/E12.008; 711/103; 711/154; 366/185.03; 366/185.04; 366/185.09

(58) Field of Classification Search
CPC ...... G11C 16/105; G11C 16/22; G11C 29/52; G11C 5/005; G11C 7/24; G11C 8/20
USPC .................. 711/103, 115, 154, E12.008, 163, 711/E12.001; 726/9, 20, 21, 34, 33; 713/166, 193, 194; 365/185.01, 365/185.03, 185.04, 185.29, 187, 188, 365/233.13, 185.09; 380/4
See application file for complete search history.

(56) References Cited

U.S. PATENT DOCUMENTS

| | | |
|---|---|---|
| 5,844,841 A | 12/1998 | Takeuchi et al. |
| 6,331,946 B1 | 12/2001 | Silverbrook et al. |

(Continued)

FOREIGN PATENT DOCUMENTS

| | | |
|---|---|---|
| JP | 2008090519 A | 4/2008 |
| WO | 2006046425 A1 | 5/2006 |

OTHER PUBLICATIONS

International Search Report in PCT/EP2009/006049, Nov. 26, 2009.

*Primary Examiner* — J. H. Hur
(74) *Attorney, Agent, or Firm* — Workman Nydegger

(57) ABSTRACT

A method for securely storing data in a multilevel memory of a portable data carrier. The multilevel memory includes one or several multilevel memory cells (SZ) which can assume respectively at least three levels (E, NE). The at least three levels represent a different data content, regarding which respective levels (E, NE) of a memory cell (SZ) are defined as valid or invalid. The levels (E, NE) of a respective memory cell (SZ) are selectively defined as valid or invalid in dependence on a required security level.

17 Claims, 1 Drawing Sheet

| | SZ | SZ | SZ | SZ |
|---|---|---|---|---|
| ADR | 0x8000 | 0x8001 | 0x8002 | 0x8003 |
| INH | 0 | 1 | 2 | 3 |
| | NE | E | E | NE |
| AKT | M | R | R | M |

(56) References Cited

U.S. PATENT DOCUMENTS

| | | | |
|---|---|---|---|
| 6,816,407 B2* | 11/2004 | Rolandi | 365/185.03 |
| 2003/0076718 A1* | 4/2003 | Rolandi | 365/200 |
| 2003/0198082 A1 | 10/2003 | Silverbrook et al. | |
| 2005/0021665 A1 | 1/2005 | Sekimoto et al. | |
| 2005/0216651 A1* | 9/2005 | Tanabiki et al. | 711/100 |
| 2008/0244211 A1 | 10/2008 | Ito | |
| 2009/0109746 A1* | 4/2009 | Aritome | 365/185.03 |

* cited by examiner

|      | SZ     | SZ     | SZ     | SZ     |
|------|--------|--------|--------|--------|
| ADR  | 0x8000 | 0x8001 | 0x8002 | 0x8003 |
| INH1 | 0      | 1      | 0      | 1      |
| LAD1 | ○      | ●      | ○      | ●      |
| INH2 | 0      | 1      | 2      | 3      |
| LAD2 | ○      | ◯      | ◉      | ●      |

Fig. 1    CONVENTIONAL ART

|      | SZ     | SZ     | SZ     | SZ     |
|------|--------|--------|--------|--------|
| ADR  | 0x8000 | 0x8001 | 0x8002 | 0x8003 |
| INH  | 0      | 1      | 2      | 3      |
|      | NE     | E      | E      | NE     |
| AKT  | M      | R      | R      | M      |

Fig. 2

METHOD FOR SECURELY STORING DATA IN A MEMORY OF A PORTABLE DATA CARRIER

BACKGROUND OF THE INVENTION

1. Field of the Invention

The invention relates to a method for securely storing data in a multilevel memory of a portable data carrier, with the multilevel memory comprising one or several multilevel memory cells, which can respectively assume at least three levels representing a different data content. A respective level of a memory cell therein can be defined as valid or invalid.

2. Related Art

A portable data carrier within the framework of the present description is understood as e.g. a chip card, a SIM (subscriber identity module) card, a key pendant equipped with a micro controller (fob), a token or the like. A micro controller of a portable data carrier comprises a non-volatile memory, for example in the form of EEPROM or flash memory cells. The mode of operation of such memories is based on the measuring of the presence or absence of an electric charge in a memory cell. More exactly, here the charge contained on a so-called floating gate of the memory cell is determined. In the multilevel memory cells not only the presence of a charge, but also the magnitude of the charge is determined in a reproducible fashion.

Methods are known by means of which the content of EEPROM/flash memory cells can be changed or erased. For example through high-energy radiation the floating gate of a memory cell can be erased. The change of data contents of a memory cell can thus be carried out both for the complete memory and selectively for certain memory cells. It is therefore possible that an attacker can tamper with the non-volatile memory regarding large areas.

To secure the data content of a non-volatile memory against tampering attacks checksums are used for the data and/or programs to be protected. As checksums for example CRC (cyclic redundancy check) or hash values are used. Due to changing data contents the corresponding checksums have to be calculated and stored anew at regular intervals. However, this procedure involves several disadvantages. On the one hand, the calculating and the storing of the checksums requires time. On the other hand, it is insufficient to determine one single checksum for the complete memory, since said checksum is not needed in many writing accesses. Consequently the non-volatile memory is protected with a plurality of checksums for different memory areas, each of which contain a number of memory cells. Moreover, the risk is given that besides the actual useful data also the corresponding checksum is tampered with within the framework of an attack, so that an operating system administrating the memory can no longer recognize data changed through the attack.

In U.S. Pat. No. 6,331,946 B1 it is therefore suggested to use for securely storing sensitive information a multilevel memory in which the two outer levels are declared invalid with regard to a stored data content. For storing information merely the levels situated within the two outer levels are used. This procedure is based on the consideration that in an attempt to tamper with the data content of a memory cell one of the invalid states of the multilevel memory cell is caused, which can be detected and recognized as tampering in a simple fashion.

BRIEF SUMMARY OF THE INVENTION

It is the object of the present invention to specify a method for storing data in a multilevel memory of a portable data carrier which allows a further improved security from tampering.

The method according to the invention proceeds from the method described in the state of the art for securely storing data in a multilevel memory of a portable data carrier. Correspondingly the multilevel memory comprises one or several multilevel memory cells, which respectively can assume at least three levels representing a different data content, and in which respective levels of a memory cell are defined as valid or invalid. According to the invention it is provided that the levels of a respective memory cell are selectively defined as valid or invalid in dependence on a required security level.

The invention is thus based on the consideration known from the state of the art not to use the complete possible storage capacity of a non-volatile memory in multilevel technology. Rather, in dependence on a required security level, i.e. of a security level defined in accordance with the necessary protection for a respective data content, the levels of a respective memory cell are selectively defined as valid or invalid. Thereby the security of the non-volatile memory can be designed so as to be scalable.

In particular the ratio of the number of valid to invalid levels of a respective memory cell is varied in dependence on the required security level. Therein it can be provided that on a maximum required security level the memory cell merely has one valid level for storing a data content, whereas all other levels which the memory cell can assume are invalid. In a different embodiment on a minimally required security level all levels of the memory cell are valid for storing data contents, so that the complete possible storage capacity of the memory cell can be used.

The method according to the invention thus makes it possible to vary the ratio of permissible or forbidden levels of data contents of the memory cells of the portable data carrier's memory, with the ratio being variable in accordance with the necessary security. It can be provided here in particular that the variation takes place within the memory, so that for example secret keys in defined memory cells are specifically protected, whereas data freely readable from the outside are provided in memory cells with little or no protection at all.

According to a further embodiment the definition of valid and invalid levels for the one or the several memory cells of the multilevel memory takes place dynamically or within the framework of production. This has the advantage that, even in the case when memory cells are tampered with in an attack so that they contain a certain charge and thus a certain data content, it is not known which levels and thus data contents are permissible or forbidden in the individual memory cells.

In a concrete embodiment the dynamic definition of valid and invalid levels for the one or the several memory cells takes place using a table, a function or a pseudo-random number generator, whose output is deterministic, that is repeatable at will. In particular during the reading of data from a memory cell the permissible levels are determined via the table, the function or the pseudo-random number generator for the memory cell in question. Only then is the reading of data from a certain address enabled. Thereby a further increase of security is achieved in storing data in a multilevel memory of a portable data carrier.

In a further embodiment it is provided that during the reading of a memory cell of the multilevel memory it is checked whether, in accordance with the defined valid or invalid levels, these represent a permissible or an impermissible data content, wherein, in the case of a permissible data content, said content is made available for further processing, and in the case of an impermissible data content it is concluded that the memory cell was tampered with. In this fashion the unintended use of data contents which were tampered with can be prevented.

In an advantageous embodiment of the method according to the invention the definition of the valid levels is used to effect in a simple fashion secure erasure, close to hardware, of memory cells which are logically declared as erased. For this purpose in an erasure process the levels defined as valid are exchanged against originally invalid ones. The data content of the memory cell thus cannot be recovered even if in a tampering attempt the associated logical erased declaration can be bypassed.

In a further advantageous embodiment of the method according to the invention the selective valid/invalid definition of the levels is used to compensate for physical changes of the memory cells caused by aging or environmental influences. Memory cells age through different environmental conditions such as humidity, heat or radiation. Individual levels can then no longer be adjusted reliably or change by themselves. The changes are permanent and usually follow a fixed, deterministic principle. For example the charges defining the individual levels of a memory cell decrease in the course of time, so that the data content represented by the charge seemingly corresponds to a different level. In the case that such a changed function of a memory cell is recognized, the original state of the memory cell can be reconstructed or maintained in a simple fashion through applying the underlying change principle to the valid/invalid definition of the levels. The recognition of an underlying change herein can take place by means of an extra sensor system. However, it can also take place through evaluating the memory cells themselves, in that for example a plurality of adjacent memory cells is checked for similar changes of their data contents. By compensating for such changes it becomes possible on the one hand to use "dying" memory cells for a longer time; simultaneously the carrying out of a compensation signals that a memory cell is no longer completely intact and should be exchanged.

DESCRIPTION OF THE DRAWINGS

In the following the invention is explained in detail with the help of an embodiment and with reference to the figures. The figures are described as follows:

FIG. 1 a table which compares the possible states of conventional and multilevel memory cells, and FIG. 2 a table which illustrates the procedure underlying the invention.

DETAILED DESCRIPTION OF PREFERRED EMBODIMENTS OF THE INVENTION

To carry out the inventive procedure a multilevel memory of a portable data carrier, in particular of a chip card, is used. The multilevel memory comprises in known fashion one or several multilevel memory cells which can assume respectively at least three levels representing a different data content. The levels of a multilevel memory cell are also referred to using the English word "levels" in German. The method for providing improved protection against tampering is based on not using the complete possible memory capacity of the non-volatile multilevel memory. Instead per memory cell selectively valid or invalid levels are defined in dependence on a required security level. Put in other terms, this means that per memory cell selectively permissible or impermissible data contents are defined. When reading out an individual memory cell of the multilevel memory it is checked whether, in accordance with the valid and invalid levels defined before, these represent a permissible or an impermissible data content, wherein in the case of a permissible data content said content is forwarded for further processing, e.g. to a calling routine of the portable data carrier. However, in the case that the data content is impermissible, it is presumed that the content of the memory cell was tampered with.

The protection in comparison to conventional memory technology, whose memory cells can merely assume two levels (states), is based on the circumstance that for an attacker it is disproportionately more difficult when tampering to reach intermediate states of a multilevel memory cell than the state of an empty or full conventional memory cell. FIG. 1 shows a table in which the exemplary contents and a respectively associated electric charge of a conventional and a multilevel memory cell with four possible levels are shown. ADR marks exemplary addresses 0x8000, 0x8001, 0x8002 and 0x8003 of a respective memory cell. INH1 represents exemplarily the data content of conventional cells in logical representation. LAD1 represents the data content of the conventional memory cells regarding their electric charge. An empty circle therein represents e.g. an uncharged floating gate and a filled circle a charged floating gate. INH2 represents exemplarily the data content of quadruple-multilevel memory cells in logical representation. LAD2 represents the data content of the quadruple-multilevel memory cells regarding the respective electric charge. The larger the ratio of the black surface to the white surface is, the bigger is e.g. the charge of the floating gate. In total, in the shown embodiment one respective multilevel memory cell can assume four different charges.

The memory cells SZ with the address 0x8000 and 0x8002 in conventional memory technology have a logical "0". In contrast, the memory cells SZ with the addresses 0x8001 and 0x8003 have a logical "1". The logical "0" is for example represented by an uncharged floating gate. In corresponding fashion a logical "1" is represented by a charged floating gate. Depending on the logic used in the memory, however, this can also be the other way around.

In contrast thereto the memory cells SZ of a multilevel memory can assume not only two but a total of four different states ("0", "1", "2" and "3"), with these different states being represented by a charge of different magnitude on the floating gate. For example a logical "0" of the memory cell SZ with the address 0x8000 is represented by an uncharged floating gate. A completely charged floating gate represents a logical "3", which is represented by way of example in the memory cell SZ with the address 0x8003. The memory cells with the addresses 0x8001 and 0x8002 have levels which lie between these two outer states. Depending on the logic used in the memory, however, this can also be the other way around.

To increase the security of the data contained in a multilevel memory for example merely the data contents "1" and "2" or their corresponding levels are defined as permissible, which is marked by "E" in the table according to FIG. 2. The data contents "0" and "3" in contrast represent impermissible data contents or levels. This means that when, during reading out a memory cell, the data contents "0" and "3" are determined, a successful tampering of the respective memory cell SZ (in table 1 of the memory cells with the addresses 0x8000 and 0x8003) is presumed. In FIG. 2 it is further shown that a permissible level representing a permissible data content is read out, whereas an impermissible level is not routed towards any further processing. This is represented schematically in the bottommost line of the table, in which a respective action AKT to be carried out is marked with M or R. M represents a memory cell which was tampered with and whose data content is not processed any further, but is for example treated in a special fashion by an operating system of the portable data carrier. R represents a memory cell which was not tampered with and whose content is read out and further processed.

The limitation of the use of certain levels or data contents indeed leads to a decrease of the available memory. However, it is connected with a substantial increase in security. The invention allows in particular making the security of the non-volatile memory scalable. On a maximally required security level it can be defined for example that the memory cell has merely one single valid level. In contrast, on a minimally required security level, it can be defined that all levels of the memory cell are valid for respective data contents. This variation can be performed within the complete multilevel memory, so that secret keys or other sensitive information can be protected specifically. In contrast, data that are freely readable form outside the multilevel memory of the portable data carrier can be stored in such a fashion that these have no or only little protection.

In a variant of a fixed definition of valid and invalid levels of a memory cell it is provided to do this dynamically for certain areas, i.e. memory cells, of the non-volatile memory. Even if it was possible for an attacker to tamper with memory cells in such a fashion that they contain a certain charge and thus a certain data content, it is unknown to the attacker which data contents are permissible or forbidden in the respective memory cells.

In a further variant it is provided to define valid and invalid levels or data contents individually per memory cell. This definition can take place via a table, a function or via a pseudo-random number generator, whose output is deterministic and thus repeatable at will. When reading data from a thus protected memory the permissible data contents for one respective memory cell, i.e. the respective memory address, have to be determined for example via the pseudo-random number generator. Only then is it possible to read the data content from the memory cell associated with the memory address.

It is further possible to perform the dynamic and memory-cell individual definition of valid and invalid levels additionally in a chip individual fashion. Before loading data contents during the production of the portable data carrier, in particular during its initialization and personalization, for example the pseudo-random number generator can be parameterized randomly in a chip-individual fashion. Using the values generated by the pseudo-random number generator then data can be loaded into the non-volatile memory.

A possible algorithm for the reading process from a memory cell can be as follows:
1. First the data content DI of a memory cell with the address X is read.
2. The permissible data contents eDI of the memory cell with the address X are determined.
3. It is checked whether the data content DI lies in the area of the permissible data content eDI. When this is the case the data content DI is considered not to be tampered with and is transferred to the calling routine. In the case that the data content does not lie in the area of the permissible data content eDI, it is presumed that the data content DI is tampered with. Corresponding measures can be initiated by the operating system.

The above-described procedure to define only certain levels of a multilevel memory cell as valid can also be used in order to effect a secure erasure, close to hardware, of multilevel memory cells. For this purpose in an erasure process the levels so far defined as valid are exchanged against invalid levels. For example in the table shown in FIG. 2 the permissible states marked with "E" are turned into impermissible states marked with "NE", and the impermissible states are turned into permissible states by replacing the "E" by "NE". In this case the memory cell can still be read out, but yields useless data contents. The redefining of levels so as to simulate erasure is all the more effective, the greater the number of possible states of a memory cell is.

Since the levels represent different physical states of a memory cell, they can also be used so as to compensate for typical, time-conditioned physical changes of the memory cell. Memory cells age i.a. through different environmental conditions such as humidity, heat or radiation. In the course of time this leads to a deteriorated function. Regularly individual levels can at some time no longer be adjusted reliably or change by themselves. However, the changed functionality is usually permanent and follows a fixed, deterministic principle. For example in the course of time the capability of a memory cell to store charges which correspond to the individual levels decreases, so that a level represented by a charge seemingly corresponds to a different data content. Through a suitable definition of a validity table, as shown in FIG. 2, the changed function of one or several memory cells can be compensated. Such a validity table could for example have, between respectively two permissible states "E", at least one impermissible state "NE". Taking account of the changed functionality to be expected now a compensation can be performed, in that for example in the case of the presence of an impermissible state "NE" the subsequently higher permissible state "E" is assumed as actual value, so as to take account of the circumstance that the level of the memory cell has dropped. The implementation of the compensation can of course take part according to more complex mechanisms. Through the compensation the use of a memory cell, even if it is no longer completely intact, can still be continued for a certain time at least. Expediently the circumstance that a compensation takes place is shown via suitable output means, so that the memory cell can be replaced or put out of service.

So as to determine whether compensable time- or environmentally conditioned changes are given in a memory cell, blocks of adjacent memory cells can be checked in a simple fashion for whether they have any similar changes or changes following a certain pattern. Alternatively the determination of time- or environmentally conditioned changes can take place by means of separate sensors.

The inventive procedure allows storing data in multilevel memories of a portable data carrier in a tampering-proof fashion, without the necessity of using additional checksums. The method is based on the use of an available memory technology with multilevel memory cells. The method can be used in a simple fashion and involving a small effort on a used operating system.

The invention claimed is:

1. A method for securely storing data in a multilevel memory of a portable data carrier, with the multilevel memory comprising one or several multilevel memory cells which can respectively assume at least three levels representing a different data content, in which respective levels of a memory cell are defined as valid or invalid, the method comprising:
    selectively defining the levels of a respective memory cell as valid or invalid in dependence on a required security level, and providing the memory cell on a maximally required security level with only one valid level.

2. The method according to claim 1, including varying the ratio of the number of valid to invalid levels of a respective memory cell in dependence on the required security level.

3. The method according to claim 1, including defining, on a minimally required security level, all levels of the memory cell as valid.

4. The method according to claim 1, including dynamically or within the framework of production defining valid and invalid levels for the one or the several memory cells of the multilevel memory.

5. The method according to claim 4, wherein the dynamic definition of valid and invalid levels for the one or the several memory cells is carried out using a table, a function or a pseudo-random number generator, whose output is deterministic.

6. The method according to claim 5, wherein during the reading of data from a memory cell the permissible levels are determined for the memory cell concerned via the table, the function or the pseudo-random generator.

7. The method according to claim 1, wherein, during the reading out of a memory cell of a multilevel memory, a checking is carried out as to whether these represent, in accordance with the defined valid and invalid levels, a permissible or an impermissible data content, wherein in the case of a permissible data content said data content is made available for further processing, and in the case of an impermissible data content it is concluded that the memory cell was tampered with.

8. The method according to claim 1, wherein, when for a memory cell a time or environmentally conditioned change was determined, in the case that an invalid level is given in this memory cell the subsequently higher permissible level is presumed to be actual level.

9. A method for securely storing data in a multilevel memory of a portable data carrier, the multilevel memory including one or more memory cells, each of the memory cells being configured to assume at least three levels representing a different data content, in which each of the levels of each of the multilevel memory cells are defined as valid or invalid, the method comprising:

defining the levels as valid or invalid for each of the memory cells individually, based on a required security level; and providing the memory cell on a maximally required security level with only one valid level.

10. The method according to claim 9, wherein, within a predetermined memory area including a first memory cell and a second memory cell, definitions of levels as valid or invalid of the first memory cell differ from definitions of levels of the second memory cell, based on the required security level.

11. The method according to claim 9, including varying the ratio of the number of valid to invalid levels of a respective memory cell in dependence on the required security level.

12. The method according to claim 9, including defining, on a minimally required security level, all levels of the memory cell as valid.

13. The method according to claim 9, including dynamically or within the framework of production defining valid and invalid levels for the one or the several memory cells of the multilevel memory.

14. The method according to claim 13, wherein the dynamic definition of valid and invalid levels for the one or the several memory cells is carried out using a table, a function or a pseudo-random number generator, whose output is deterministic.

15. The method according to claim 14, wherein during the reading of data from a memory cell the permissible levels are determined for the memory cell concerned via the table, the function or the pseudo-random generator.

16. The method according to claim 9, wherein, during the reading out of a memory cell of a multilevel memory, a checking is carried out as to whether these represent, in accordance with the defined valid and invalid levels, a permissible or an impermissible data content, wherein in the case of a permissible data content said data content is made available for further processing, and in the case of an impermissible data content it is concluded that the memory cell was tampered with.

17. The method according to claim 9, wherein, when for a memory cell a time or environmentally conditioned change was determined, in the case that an invalid level is given in this memory cell the subsequently higher permissible level is presumed to be actual level.

* * * * *